United States Patent Office 3,560,413
Patented Feb. 2, 1971

---

3,560,413
PROCESS FOR VULCANIZING AND FOAMING
ACTIVE LIQUID DIOLEFIN POLYMERS
Douglas C. Edwards, Sarnia, Ontario, and Peter Noel
Lewis, Calgary, Alberta, Canada, assignors to Polymer
Corporation Limited, Sarnia, Ontario, Canada, a body
corporate and body politic
No Drawing. Filed Jan. 12, 1968, Ser. No. 697,326
Claims priority, application Canada, Feb. 3, 1967,
981,925
Int. Cl. C08f 27/03, 47/10
U.S. Cl. 260—2.5                                     8 Claims

ABSTRACT OF THE DISCLOSURE

A liquid polymer of an olefinically unsaturated compound, e.g. butadiene-1,3, the polymeric molecules of which have more than one active halogen atom, for example, two allylic bromides, is mixed with a small amount of an amine salt of an acid such as haloacetic acid or carbon dioxide to produce a homegeneous mixture and then the amine salt is decomposed whereby the mixture is foamed and vulcanized to produce a cellular vulcanizate. Triethylene tetramine trichloracetate salt is one of the amine salts which may be used.

---

This invention relates to liquid polymers of olefinically unsaturated hydrocarbon monomers and particularly to the vulcanization of these polymers.

In this specification, liquid polymers are defined broadly as pourable polymers; such polymers are non-volatile and generally have intrinsic viscosities of not more than about 1.0 dl./g. in toluene at 30° C., and vulcanizates are the solid reaction products of the liquid polymer with compounds which are capable of linking molecules of the liquid polymers.

Previously, liquid polymers of $C_4$–$C_8$ diolefins, containing allylic halogen groups have been mixed with multifunctional amines and vulcanized therewith. The liquid polymers have been described in French Patent 1,488,811. It has not been previously possible to prepare cellular vulcanizates from such mixtures. Cellular vulcanizates are useful in such applications as mattresses, cushions, carpet backing, etc.

The object of this invention is to provide a novel process for the production of cellular structures. A further object is to provide novel cellular structures based on liquid polymers containing allylic halide groups.

It has been found that the liquid polymers containing allylic halide groups such as are described in French Patent 1,488,811 can be mixed at low temperatures with salts of polyamine with certain acids such as trichloroacetic acid to produce homogeneous compositions. These compositions are stable for sufficiently long periods of time so that they can be poured into forms or otherwise shaped and then be foamed and vulcanized in a single step, for example, by heating, whereby solid cellular structures are produced.

This invention provides a process of producing a cellular vulcanized structure which comprises mixing (a) a major proportion of a liquid polymer of an olefinically unsaturated compound, said polymer comprising polymeric molecules containing more than one active halogen atom, and (b) a minor amount of an amine salt of an acid selected from haloacetic acids and carbon dioxide, whereby a homogeneous composition is produced, and decomposing said amine salt in said composition whereby said composition foams and vulcanizes to produce said cellular structure.

The liquid polymer that is used in the process of this invention is a non-volatile material having a molecular weight above 1000 and preferably at least 2000. Above this lower limit, the molecular weight may vary widely, although it is desirable that the polymer is liquid and pourable, preferably at room temperature, that is, that it has a bulk viscosity of not more than 5000 poise at 25° C. However, it is within the scope of this invention to use higher molecular weight polymer, the bulk viscosity of which has been reduced to the desired level with a compatible oil.

The liquid polymer is characterized by the presence of more than one active halogen per molecule in the majority of the molecules. The preferred active halogens are in the form of allylic halide groups having the formula

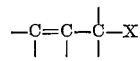

in which X is a halogen atom. The halogen atom may be selected from chlorine, bromine or iodine, although best results are obtained with liquid polymers having allylic bromide groups. It is preferred that the allylic halide groups are attached to the polymeric molecules in terminal positions, i.e. at the ends of linear chain molecules and, if the molecules are branched, at the end of branches. However, the presence of allylic halide groups in the middle portions of the chain molecules is not detrimental. The polymer is an addition polymer such as may be prepared by a free radical polymerization of olefinically unsaturated compounds. It may be a homopolymer or a copolymer of two or more polymerizable compounds. Unsaturated hydrocarbons are the preferred compounds, although a small proportion of the polymerizable compounds may contain oxygen, nitrogen and/or chlorine atoms. The preferred liquid polymers used in this invention are polymers of diolefinic hydrocarbons such as butadiene-1,3, isoprene, pentadiene-1,3,2,3 - dimethylpentadiene, and best results are obtained with polymers of butadiene-1,3 with or without a minor amount of copolymerized vinyl compounds such as styrene, acrylonitrile, alkyl acrylate and others. Depending on the molecular weight of the liquid polymer, number of the allylic halide groups and type of the halogen atom, the halogen content of the liquid polymer falls within the range of 1–15 weight percent and preferably within the range of 1.5–10 weight percent.

The liquid polymer suitable for use according to this invention may be prepared by various processes. One of such processes is a direct polymerization of monomers in the presence of halogen containing modifiers such as described in French Patent 1,488,811. It is also possible to produce such liquid polymers by a halogenation of unsaturated polymers under conditions such that at least two allylic halide groups are produced in a polymeric molecule.

The amine salt component of the present invention is formed by the reaction of an amine, preferably a polyamine, with a haloacetic acid or with carbon dioxide. Examples of suitable amines include hexamethylene diamine, diethylene triamine, triethylene tetramine, tetraethylene pentamine, N-amino-ethyl piperidine, etc. and their partially or completely alkylated derivatives such as the methylated and ethylated derivatives. Polyamines having more than two amine groups, for example, polyalkylene tetramine or pentamine, are particularly suitable since they can tie up a moderate amount of vulcanization-interfering monofunctional polymer molecules that may be present in the liquid polymer and still allow for chain extension of the difunctional polymer molecules to obtain satisfactory physical properties. Examples of suitable amine salts include the reaction products of trihaloacetic acid with an amine selected from methylated hexamethylene diamine, diethylene triamine, methylated triethylene tetramine, tetraethylene pentamine, triethylene tetramine and hexamethylene diamine. The haloacetic acid may contain more than one halogen atom attached to the alpha carbon atom and the halogens may be the same or different selected from chlorine, bromine or iodine. Representative examples of the haloacetic acids are trichloroacetic acid, tribromoacetic acid, dibromoacetic acid. The preferred amine salt of a haloacetic acid is the reaction product of trichloroacetic acid and methylated triethylene tetramine. Such amine salt may be preformed and added to the liquid polymer or it may be made in situ; in the latter case the trihaloacetic acid may be added to the liquid polymer and the amine added separately when required. It is believed that the amine salt decomposes, preferably under the action of heat, to form carbon dioxide, the halo-form and the parent amine; the gaseous products cause foaming and the amine vulcanizes the system.

The salt of an amine with carbon dioxide which can be used in accordance with this invention is produced by the action of carbon dioxide on a primary amine containing up to 10 carbon atoms in the molecule, preferably about 2–6 carbon atoms. It is preferred to use a reaction product of carbon dioxide and a polyamine having two or more amine groups separated from each other by a hydrocarbon radical containing 2–6 carbon atoms. The product generally belongs to the category of ammonium salts of a carbamic acid. For example, the reaction product of carbon dioxide and polyalkylene diamine is known under the generic name of amino alkylene carbamic acid or preferably ammonium alkylene carbamate; the latter name emphasizes its salt-like character. The salts of the above type decompose at a temperature varying from 30 to 160° C. in the presence of the liquid polymer and yield the parent amine and carbon dioxide. Representative examples of these salts are amino ethylene carbamic acid, the reaction product of $CO_2$ and $H_2NC_2H_4NH_2$, and amino hexamethylene carbamic acid, the reaction product of $CO_2$ and $H_2N(CH_2)_6NH_2$.

The amount of amine salt used is minor to the amount of liquid polymer and is in the range of about 0.5 to 15 parts by weight of amine in the amine salt per 100 parts by weight of polymer and is preferably in the range of about 0.5 to 10 parts by weight and is most preferably in the range of about 0.5 to 5 parts by weight.

The rate of vulcanization of the liquid polymer of this invention will vary dependent on the temperature, said temperature being up to about 16° C., the amount and type of salt employed and the activity of the polymer.

Compounding ingredients, such as fillers, colouring pigments, tackifiers and plasticizers also may be incorporated into the compositions of this invention. Examples of fillers include carbon blacks, powdered metals, silicas, clays, calcium carbonate, metal oxides, etc. The plasticizer used must be compatible with the liquid polymer. Suitable plasticizers include paraffinc and naphthenic oils, esters, chlorinated polyphenyls, etc. The bulk viscosity of the liquid polymer compositions, can be increased when desired, by the addition of materials such as polyethylene, polypropylene, ethylene-propylene copolymers containing more than about 80 mole percent ethylene, ethylene-vinyl acetate copolymer, trans-1,4 polyisophene and trans-1,4 polybutadiene.

The following examples will further illustrate the invention. In these examples, all parts are parts by weight.

EXAMPLE I

The liquid polymer of butadiene having terminal allylic bromide groups was prepared as follows:

100 parts of butadiene and 15 parts of tetrabromomethane were emulsified in 200 parts of water containing 7.5 parts of dissolved sodium alkyl aryl sulfonate and 5 parts of dissolved tripotassium phosphate buffer. After raising the temperature of the system to 140° F., 0.75 part of potassium persulfate was added to initiate the polymerization reaction. A further 1.5 parts of potassium persulfate was added, in increments, to the agitated emulsion during the course of the reaction. After 36 hours, 87% of the butadiene was converted to polymer. The polymer was coagulated and washed in acetone, and dried under vacuum at 90° C. 1.25 parts of methylene-bis (2-nonyl-4-methyl) phenol antioxidant were added prior to the vacuum drying step. The dried polymer was a viscous liquid having an intrinsic viscosity in toluene at 30° C. of 0.26 dl/g. and a combined bromine content of 4.7 weight percent.

The amine salt was prepared by adding 1 mole of $N,N,N^1,N^2,N^3,N^3$-hexamethyl triethylene tetramine to 4 moles of trichloroacetic acid, both reactants being dissolved in methanol. The solution was evaporated to dryness at room temperature to yield the dry salt.

9.6 parts of the amine salt, 25 parts of a naphthenic oil (specific gravity 0.92, Viscosity Saybolt Universal Seconds 155 at 37.8° C.) and 1.5 parts of a silicone oil (available from Dow Corning Silicone Ltd. under the trade name DC–200) were added to 100 parts of the liquid polymer described above; a homogeneous compound was prepared by passing the mixture twice through a paint mill.

A 7 gms. portion of the compound was placed in an oven at 120° C. In the first 5 minutes the compound foamed to several times its initial volume. After 10 minutes an elastic, open-cell cellular vulcanizate formed.

Another portion of the compound was still liquid, that is unvulcanized, after 12 hours at room temperature.

EXAMPLE II 12.9 parts of tribromoacetic acid, 25 parts of a naphthenic oil and 1.5 parts of a silicone oil were added to 100 parts of the liquid polymer of Example I. The components were first mixed at 80° C. to dissolve the acid in the liquid polymer; mixing was completed, at room temperature, on a paint mill. 2.5 parts of hexamethyl triethylene tetramine were then added and dispersed in the mixture at room temperature. One hour after adding the amine, the compound had set up at room temperature to a tack-free, fine pored cellular product. Four hours after adding the amine, the cellular product was found to be highly extensible and elastic.

The salt of the hexamethyl triethylene tetramine with tribromoacetic acid was less stable than the corresponding salt with trichloroacetic acid and decomposed at a temperature as low as room temperature to produce gaseous blowing agents and to release hexamethyl triethylene tetramine for the vulcanization of the foamed liquid polymer.

EXAMPLE III

The compounds a to e shown in Table I below were prepared using different amounts and types of amine salts. The first three ingredients, that is, the liquid polymer, naphthenic oil and the silicone oil, were masterbatched and portions containing 10 gms. of the liquid polymer were used for the individual compounds. Mixtures were prepared in 250 mls. beakers. The acid was stirred in at 80° C., using a water bath, and the amine was added after cooling to room temperature. The beakers were then placed in an oven at 100° C.

TABLE I

|  | a | b | c | d | e |
|---|---|---|---|---|---|
| Compound: |  |  |  |  |  |
| Liquid polymer | 100 | 100 | 100 | 100 | 100 |
| Naphthenic oil | 25 | 25 | 25 | 25 | 25 |
| Silicone oil | 1.5 | 1.5 | 1.5 | 1.5 | 1.5 |
| Trichloroacetic acid | 4 | 10 | 7 | 7 | 7 |
| Hexamethyl triethylene tetramine | 2.5 | 2.5 | 2 | 3 |  |
| Triethylene tetramine |  |  |  |  | 1.6 |

In every case, the mixtures foamed and set during 10 minutes. On removal after 30 minutes, all had cured to elastic open-celled cellular vulcanizates. Compound (b) was notably coarser in cell structure than the others, owing probably to slower cure. Compound (e) was the most resilient; it was also much "shorter" than the others, that is, it failed at lower elongations.

The experiment illustrates that there is considerable variation in the loadings of acid and amine which may be used, and that amines having primary and secondary groups, as well as those having only tertiary groups, are applicable.

An additional compound, basically similar to compound (a), except for the absence of naphthenic oil and silicone oil, was prepared by dissolving the trichloroacetic acid in the liquid polymer at 75° C., cooling the solution at room temperature, and dispersing the hexamethyl triethylene tetramine. A sample of the compound containing about 10 gms. of the liquid polymer was then placed in a 250 mls. beaker and heated in an oven at 100° C. for 30 minutes. A rubber-elastic cellular structure with a coarse open-cell structure was obtained.

This experiment shows that naphthenic oil and silicone oil are not essential in the process of this invention. The former was used as an extender for the liquid polymer and the latter as a surface active material controlling the uniformity of cells in the resulting cellular structure.

EXAMPLE IV

The compounds shown in Table II below were prepared as described previously in Example III except that the fillers, such as calcium carbonate, were added after the amine had been incorporated.

TABLE II

| | a | b | c | d | e |
|---|---|---|---|---|---|
| Compound: | | | | | |
| Liquid polymer | 100 | 100 | 100 | 100 | 100 |
| Naphthenic oil | 25 | 25 | 25 | 25 | 25 |
| Silicone oil | 1.5 | 1.5 | 1.5 | 1.5 | 1.5 |
| Trichloroacetic acid | 7.1 | 7.1 | 7.1 | 7.1 | 7.1 |
| Methylated triethylene tetramine | 2.5 | 2.5 | 2.5 | 2.5 | 2.5 |
| Calcium carbonate | 5 | | | | |
| Hydrated aluminum silicate | | 10 | | | |
| Calcium silicate | | | 10 | | |
| Magnesium silicate | | | | 20 | |
| Low structure high abrasion furnace black | | | | | 5 |

The compounds were heated in an oven at 90° C. After 15 minutes, all had expanded and set. After 30 minutes, the compounds had all formed elastic open-cell cellular vulcanizates having generally simiar physical properties. The experiment shows that a variety of filler types, including carbon black, may be used without detriment to the process.

These experiments suggest a generalized basic recipe, based on 100 parts of polymer, exclusive of waxes, antioxidants, odorants, coloring pigments or other special-purpose additives, as follows:

| | |
|---|---|
| Polymer | 100 |
| Plasticizer | 0—100 |
| Fillers | 0—200 |
| Silicone oil | 0—3 |
| Trihaloacetic | 1—20 |
| Polyfunctional amines | 0.5—15 |

EXAMPLE V

A compound similar to (a) of Example IV, except that it contained 10 parts calcium carbonate and 5 parts paraffin wax, was prepared as described previously.

160 gms. of the compound was poured into the charging port of a laboratory extruder, operating with a head temperature 105° C. During 90 seconds, the mixture was delivered into a 885 mls. sheet mould, which had been preheated to 80° C. The mould was transferred to an oven at 80° C. for one hour. There was slight overflow as expansion occurred, some foam discharging from the hole in the mould cover. From a knowledge of the capacity of the mould, it was calculated that the compound had expanded to approximately 6 times its initial volume.

After cooling, the slab was removed for examination. It was found to be uniform in structure, with open cells in the order of 1/16" diameter. Vulcanization appeared uniform throughout. The cellular product was elastic and highly extensible.

A portion of the same compound was heated under pressure, in a mould between sheets of polytetrafluoroethylene, using a press, for 10 minutes at 120° C. Upon opening the mould, the compound expanded, giving a fine-structure, highly elastic closed cell cellular vulcanizate. This demonstrated that closed-cell products can be prepared using the same type of compound.

EXAMPLE VI

A mixture was prepared from 1.5 parts of silicone oil, 25 parts of naphthenic oil and 100 parts of the liquid polymer of Example I. 0.35 part, 0.5 part and 1.75 parts, respectively, of amino hexamethylene carbamic acid and 0.25 part, 0.5 part and 0.8 part, respectively, of amino ethylene carbamic acid were added to and dispersed in separate portions of the mixture on the paint mill.

Portions of the separate compounds were placed in an oven at 150° C. After 10 minutes, the compounds had all formed open-cell cellular vulcanizates.

The remainders of the compounds were still liquid, that is unvulcanized, after 70 hours at room temperature.

What is claimed is:

1. A process of producing a cellular vulcanized structure which comprises mixing (a) a major proportion of a liquid polymer of a conjugated diolefin containing 4 to 8 carbon atoms, said polymer comprising polymeric molecules containing more than one allylic halide group, and (b) a minor proportion of an amine salt of a haloacetic acid, whereby a homogeneous composition is produced, and decomposing said amine salt in said composition whereby said composition foams and vulcanizes to produce said cellular structure.

2. The process according to claim 1 in which the liquid polymer is a polymer of butadiene-1,3.

3. The process according to claim 2 in which the halogen atom in the allylic halide groups is bromine.

4. The process according to claim 2 in which the intrinsic viscosity of the liquid polymer is not more than about 1.0 decilitres per gram measured in toluene at 30° C.

5. The process according to claim 2 in which the amine salt is mixed in an amount of 0.5 to about 15 parts by weight of amine per 100 parts by weight of the liquid polymer.

6. The process according to claim 5 in which the amine salt is a salt of triethylene tetramine or of an N-alkyl substituted triethylene tetramine.

7. The process according to claim 5 in which the haloacetic acid is trichloroacetic acid.

8. The process according to claim 5 in which the mixing is carried out at about room temperature and the decomposition at a temperature of up to about 160° C.

References Cited

UNITED STATES PATENTS

| 3,177,190 | 4/1965 | Hsieh | 260—82.1 |
| 3,320,187 | 5/1967 | Burt | 260—2.5(EP) |
| 3,506,742 | 4/1970 | Buckler et al. | 260—889 |

MURRAY TILLMAN, Primary Examiner

W. J. BRIGGS, SR., Assistant Examiner

U.S. Cl. X.R.

260—31.2, 33.4, 33.6, 41.5, 83.3, 83.5, 85.1, 94.7, 655, 889, 894

UNITED STATES PATENT OFFICE
CERTIFICATE OF CORRECTION

Patent No. 3,560,413          Dated February 2, 1971

Inventor(s) Douglas C. Edwards et al

It is certified that error appears in the above-identified patent and that said Letters Patent are hereby corrected as shown below:

Column 3, line 47, "16°C" should read -- 160°C --; column 5, line 57, "Trihaloacetic" should read -- Trihaloa acid --.

Signed and sealed this 19th day of December 1972.

(SEAL)
Attest:

EDWARD M. FLETCHER, JR.                  ROBERT GOTTSCHALK
Attesting Officer                           Commissioner of Pa